United States Patent
Perlick et al.

(10) Patent No.: US 10,015,260 B2
(45) Date of Patent: Jul. 3, 2018

(54) METHOD AND APPARATUS FOR ADVANCED VEHICLE DATA DELIVERY USING SECONDARY DEVICE

(71) Applicant: FORD GLOBAL TECHNOLOGIES, LLC, Dearborn, MI (US)

(72) Inventors: Donald A. Perlick, Farmington Hills, MI (US); Jerry Alex James, Ypsilanti, MI (US); Howard Churchwell, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/335,894

(22) Filed: Oct. 27, 2016

(65) Prior Publication Data

US 2018/0124177 A1   May 3, 2018

(51) Int. Cl.
| | |
|---|---|
| *H04W 4/00* | (2018.01) |
| *G07C 5/00* | (2006.01) |
| *H04L 29/08* | (2006.01) |
| *H04L 12/28* | (2006.01) |
| *H04W 4/80* | (2018.01) |
| *H04W 84/18* | (2009.01) |
| *H04W 84/12* | (2009.01) |
| *H04W 84/04* | (2009.01) |

(52) U.S. Cl.
CPC .......... *H04L 67/12* (2013.01); *H04L 12/2856* (2013.01); *H04W 4/008* (2013.01); *H04W 4/80* (2018.02); *H04W 84/042* (2013.01); *H04W 84/12* (2013.01); *H04W 84/18* (2013.01)

(58) Field of Classification Search
CPC ........ H04W 4/00; H04W 4/008; H04L 12/28; H04L 12/2856; H04L 67/12; G07C 5/00; G07C 5/50816; G07C 5/50825
See application file for complete search history.

(56) References Cited

U.S. PATENT DOCUMENTS

| | | | |
|---|---|---|---|
| 9,125,028 B2 | 9/2015 | Perner | |
| 2009/0025864 A1* | 1/2009 | Fox | ..................... B05B 15/0456 156/196 |
| 2015/0121275 A1* | 4/2015 | Marshall | .............. G07C 5/0808 715/771 |
| 2016/0063773 A1 | 3/2016 | Hatton et al. | |
| 2016/0379423 A1* | 12/2016 | Nagata | ................ B60R 16/0234 701/31.5 |

OTHER PUBLICATIONS

COBI Bike, Product | COBI Bike, COBI—the first smart connected biking system. Less Complexity. More Possibilities., http://www.cobi.bike/product, 19 pages, Jun. 27, 2016.

\* cited by examiner

*Primary Examiner* — Blane Jackson
(74) *Attorney, Agent, or Firm* — Jennifer Stec; Brooks Kushman P.C.

(57) ABSTRACT

A system includes a processor configured to receive sensor data from a vehicle sensor. The processor is also configured to determine an existence of a condition for which information display has been designated. The processor is further configured to determine a non-vehicular device predesignated for receipt and display of the information and responsive to the condition determination, transfer the information to the device.

19 Claims, 3 Drawing Sheets

US 10,015,260 B2

METHOD AND APPARATUS FOR ADVANCED VEHICLE DATA DELIVERY USING SECONDARY DEVICE

TECHNICAL FIELD

The illustrative embodiments generally relate to a method and apparatus for advanced vehicle data delivery using a secondary device.

BACKGROUND

Vehicles are becoming more connected and capable of providing a wealth of information relating to both detected vehicle conditions and environmental changes around a vehicle. Sometimes this information can be output to an in-vehicle display or audio system, depending on the nature of the available information (e.g., format) and the vehicle output capabilities.

While it is common for vehicle manufacturers to include both video and touchscreen displays in vehicles, as well as digital dashboard displays that can be dynamically reconfigured, these improved video displays are still often limited in some capacity compared to alternative digital counterparts.

Alternative digital counterparts include, for example, mobile devices, which often have advanced display and input/output capability. These devices provide a viable option for information presentation at a low cost, since consumers typically already own such a device. These devices almost always include some form of connectivity to remote sources as well, whether it is cellular, Wi-Fi, BLUETOOTH or other wireless communication.

SUMMARY

In a first illustrative embodiment, a system includes a processor configured to receive sensor data from a vehicle sensor. The processor is also configured to determine an existence of a condition for which information display has been designated. The processor is further configured to determine a non-vehicular device predesignated for receipt and display of the information and responsive to the condition determination, transfer the information to the device.

In a second illustrative embodiment, a computer implemented method includes determining a capability of a vehicle to convey the information, responsive to a determination that information for display exists, relating to a vehicle-related condition determined from vehicle sensor data. The method also includes instructing delivery of the information to a predesignated user device, responsive to a determination that the vehicle is incapable of conveying the additional information.

In a third illustrative embodiment, a system includes a processor configured to examine vehicle sensor data to detect a vehicle condition. The processor is also configured to determine that information display of information relating to the vehicle condition is appropriate based on predefined criteria, associated with the vehicle condition, for displaying the information. The processor is further configured to determine a format associated with the information, including delivery capability needed to convey the information and determine whether the information should be sent to a vehicle, a predesignated information output device, or both.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
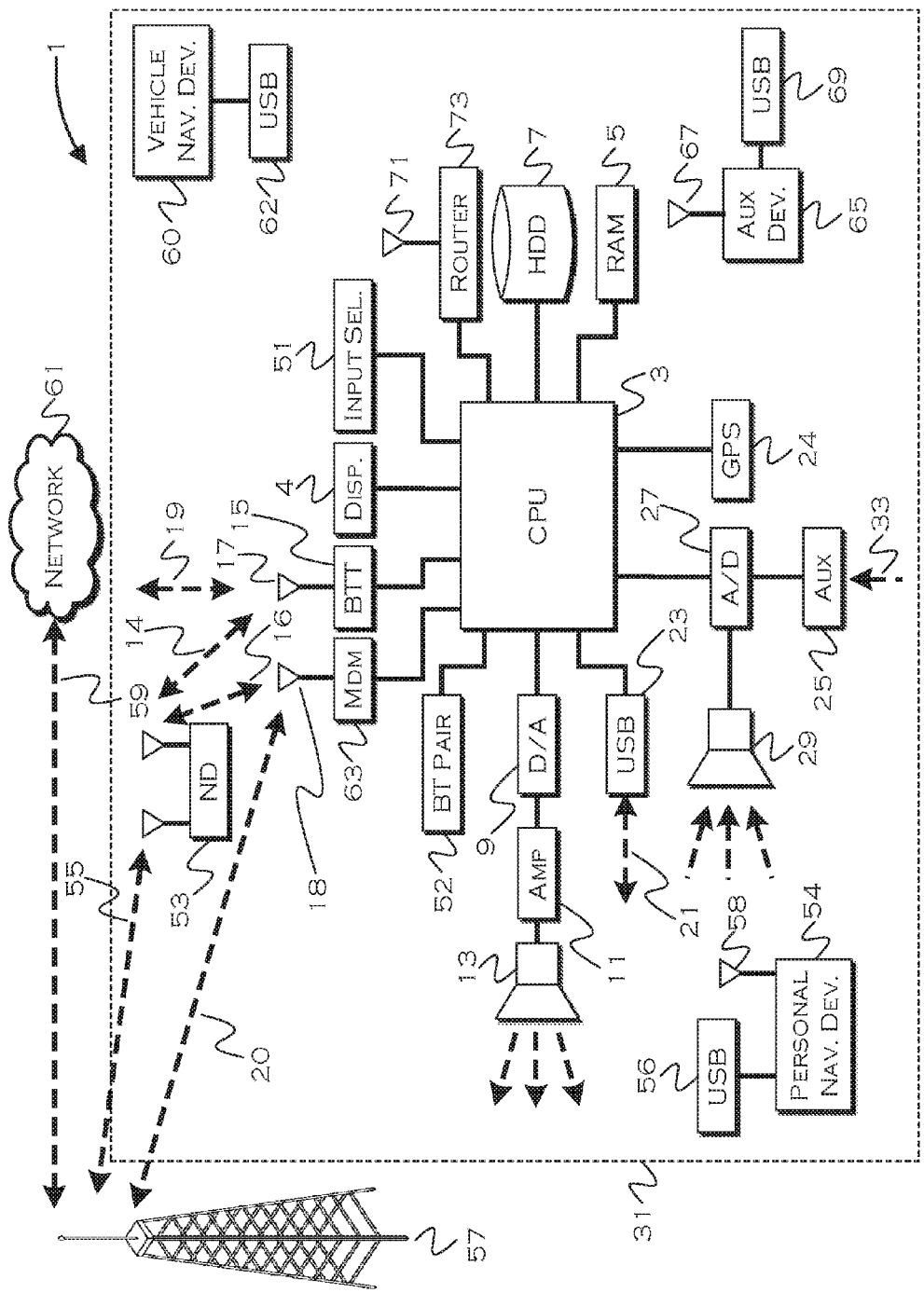
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output.

The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Continuing improvement in onboard computing power of mobility platforms means that conveyances and vehicles have increasing amounts of shareable information, but often the manufacturer primarily focuses on improving the vehicle or conveyance, without as much regard to including outputs and interfaces. In other examples, more expensive vehicle models might include better information delivery systems, but an owner of a lesser model is left without adequate outputs to receive all of the available information.

Because vehicles and conveyances (to some extent) can now communicate with driver and occupant devices (e.g., smartphones), the communicating vehicle can use the interface and outputs of the smartphone to relay important information. In this manner, the driver/occupant obtains an upgraded and capable screen or interface, through a device already possessed, without any added cost to the manufacturer in hardware installation.

When a new vehicle is purchased, a user can pair or designate a mobile device or other output as an information delivery device. The device may even be a device such as a home PC or other device that may not even be in a vehicle. Connectivity to the device, if it is a portable device, can be managed and maintained through Wi-Fi, BLUETOOTH or other wireless or wired technology. If the device is not portable, or is kept remotely from a vehicle (out of range), a cellular connection to the Internet can be used to provide information to the device.

If there is a vehicle-related situation that could result in presentation of information, but the onboard information outputs are limited and cannot provide the needed information (or if another output medium is simply preferred), the situation can trigger the vehicle to send or instruct sending of information relating to the situation to the designated device. If the device is portable, such as a cell phone, the vehicle could directly convey the information, or sound an alert on the device (at a safe time) so the driver knows to utilize the device to receive the information. Or the vehicle can instruct device utilization through vehicle speakers, for example.

In some instances, the information may only be immediately useful, so if the designated device is a remote device not present or detected in the vehicle, the information may be relayed for informative purposes, but not necessarily use purposes. Other times, the vehicle may simply forego sending the information unless the device owner can immediately use the information.

For example, if a user becomes stuck in snow or mud, the vehicle could use a local device to provide detailed instructions for maneuvering the car out of the stuck condition. The vehicle could also provide tow information, if the driver cannot free the vehicle. If the information were alternatively or additionally conveyed to a remote device (e.g., home PC), maybe the maneuvering information could be conveyed (for improving driver skills), but the tow information would be left out, because the driver probably does not need a tow by the point the driver sees the information.

The vehicle may also wait until a time that the vehicle determines it is reasonable for a driver to view the information, before transferring the information, if the information is going to be conveyed to a local, portable device. This can include, for example, waiting until a vehicle is in park. The particular conditions for viewing may also depend on the nature and volume of the information designated for viewing. For example, a one sentence message may be available for viewing in a situation where a user may only be temporarily stopped, whereas a video or several sentences or a paragraph may only be presented on the device when a vehicle has been placed in park. Of course, even the single sentence could be similarly constrained.

In other examples, the process may delay delivery, lock the message or data from viewing, and/or delay alerting a user to the availability of the information until a situation that has been predesignated as a situation where viewing is appropriate, exists.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures, it is noted that a general purpose processor may be temporarily enabled as a special purpose processor for the purpose of executing some or all of the exemplary methods shown. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Figure 2:
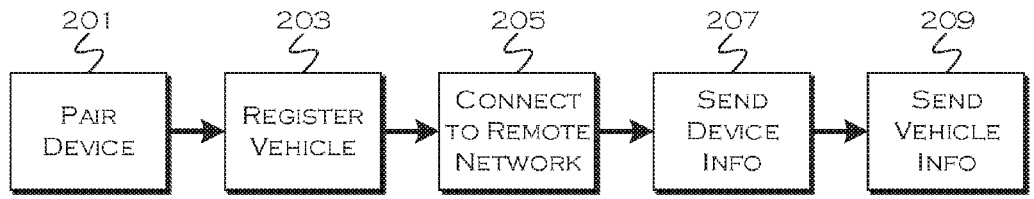
FIG. 2 shows an illustrative example of a device-designation process.

FIG. 2 shows an illustrative example of a device-designation process. In this illustrative example, the process determines that a user desires to pair a device with the vehicle for designation as an information delivery device 201. This could be a traditional BLUETOOTH pairing, or something less conventional, such as designating a home PC or email address for information delivery.

The vehicle about which information is to be obtained may be registered. In some cases, if the vehicle has an interface, an owner can perform this process on the vehicle. In other cases, as with some conveyances and vehicles lacking interfaces, the process can be done on a PC or other device disconnected from the vehicle. In either event, the vehicle is registered as the conveyance about which information is to be obtained 203.

The process then connects (if not already connected) to a remote server 205 and sends the information about the vehicle 209 and the device 207 for storage in a user account. The vehicle can also locally store the information, if the vehicle has storage capability. In other examples, the vehicle may have extremely limited local storage capability, and may simply transmit an alert or message to the device with a code, the device could then contact a remote server to obtain more detailed information. In this case, the device may store the vehicle and account information.

Figure 3:
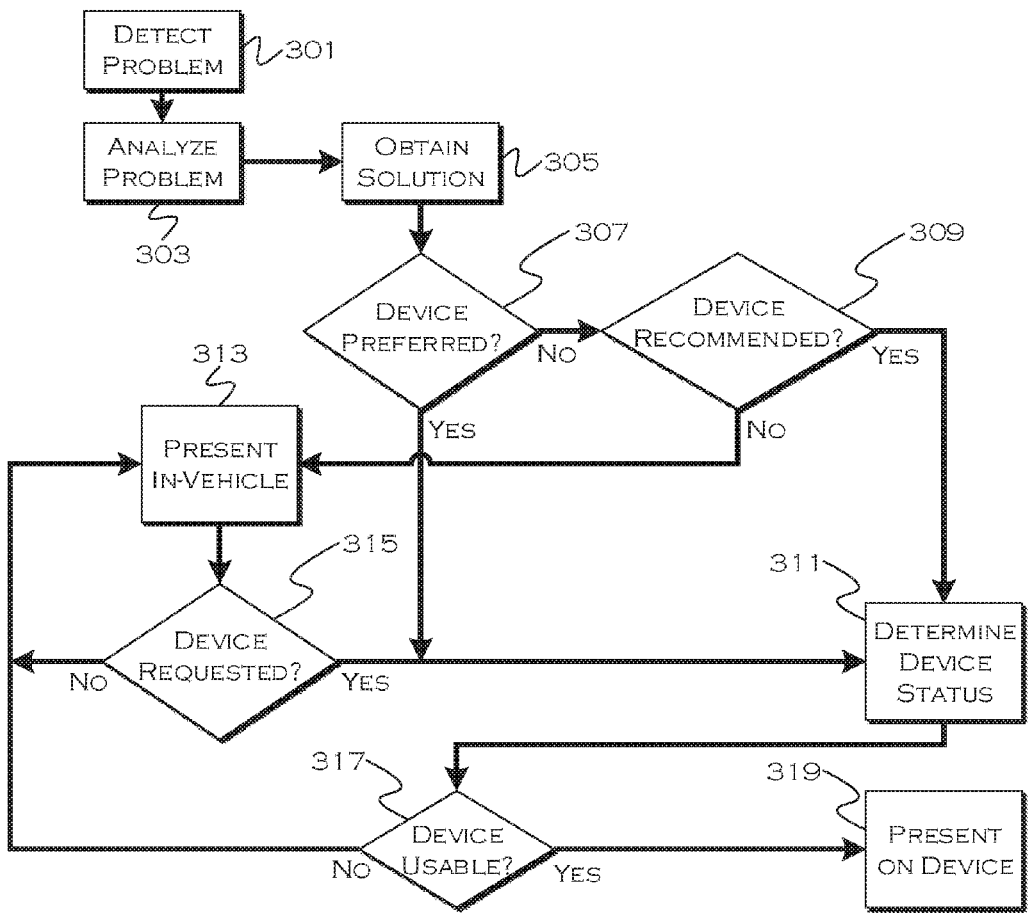
FIG. 3 shows an illustrative information provision determination process.

FIG. 3 shows an illustrative information provision determination process. In this example, a vehicle or conveyance sensor detects a current problem or reason to convey additional information to a driver or occupant 301. If possible on-board, the vehicle analyzes the problem 303, or the vehicle identifies the problem for analysis on the device or at a remote server.

If the problem can be analyzed (by whatever entity is doing the analysis), the entity may determine that there is a solution or information that would be additionally useful. This analysis and determination could take place on the vehicle, with a library of solutions for known problems, on a mobile device, with analytic capability and a similar library, or at a remote server similarly appointed. In other examples, one entity may perform the analysis and another entity may identify the solution, and even a third entity may receive and present the solution.

In this example, the vehicle performs the analysis onboard, and determines if a driver has requested that the information be preferably conveyed on the device 307. If not, the vehicle determines if there is related or useful information that is in a device preferred deliverable format 309 (either because the device is the best/preferred/designated medium or because the vehicle outputs are inadequate for displaying the information). In either case, the process then determines if the device is ready or capable of receiving the information 311.

If the device is in a usable or otherwise acceptable state 317, the process may present the information on the device 317, or present instructions for receiving/retrieving the information on the device. If the vehicle first conveys the information or an alert on a vehicle output 313, a driver may request utilization of the device 315 (for the same information or for additional information). If the device is unreachable or unusable, the vehicle may queue the information for later delivery, deliver the information to a secondary device, or even simply output the information in the vehicle (if possible), without an option to utilize transfer of the information to the device.

Figure 4:
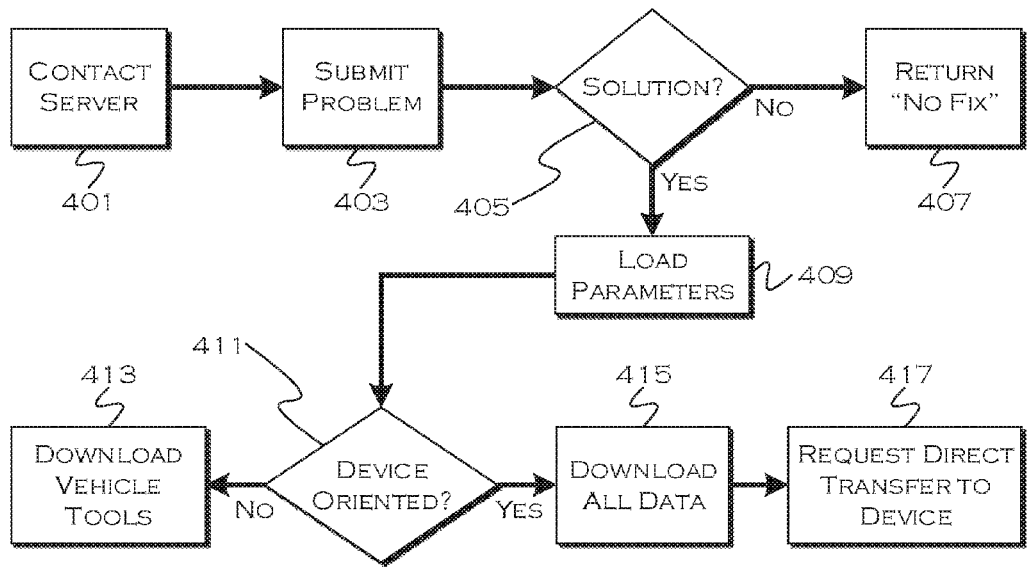
FIG. 4 shows an illustrative information relay process.

FIG. 4 shows an illustrative information relay process. In this illustrative example, the vehicle may identify either an initial problem or a set of sensor conditions indicative of a problem. In addition to problems, the vehicle and/or sensor conditions may indicate a situation where additional information may be useful. For example, if a vehicle crossed into a new state, the vehicle could provide a quick list of driving rules (max speed limits, no radar detectors allowed, no texting while driving, etc) to a user device.

In this example, when a condition for providing additional information is met (be it sensor data gathering, problem determination, etc.) 401, the process will submit the data or the identified problem/situation 403 to a remote server.

In this example, the additional data is stored on a remote server for provision to the designated user device, but in other examples, the data could be stored in a library on the vehicle or on the device itself. For example, if a large library of additional data were stored on the device, the vehicle could identify a problem and instruct the device to retrieve the appropriate information. An example such as this would limit the amount of data stored on the vehicle and/or the data transfer between the vehicle and the device. In other examples, some or all of the data relating to the additional information may be transferred by one entity (vehicle, server) to another (vehicle, device).

In each model, one or more of the entities is designated to determine the solution or additional information that should be retrieved and presented to a driver. If the designated entity (in this case, a server), determines that a solution (or additional information) is not available 405, the process deliver a message to the receiving entity (in this case, a device) that identifies the problem but notes that additional information and/or a solution is not known 407 or deliverable.

If a solution exists, the process may load a set of parameters associated with the solution, which identifies, among other things, what formats and outputs are best suited for delivering the information 409. For example, some information may be in the form of a video or interactive display, and other information may simply be text, requiring a much more simplified output to be conveyed. Since users can designate different devices as information-receipt devices, the process may determine if the designated device(s) is/are appropriately suited for receiving and conveying the information. The process may also determine if the solution is better conveyed on a device or vehicle output 411.

If the information is better or preferred to be displayed on a vehicle output, the process may download the relevant information (such as data or display tools) to a vehicle for display 413. If the process determines that the information is better displayed on a device (or mixed display is appropriate), the process may download all of the relevant data for both the vehicle and device 415 and then request direct transfer of the device-relevant information to the device 417 from the vehicle. In other examples, the remote server may relay the vehicle-relevant information to the vehicle for display, and the device relevant information to the device for display (e.g., send an audio alert to a vehicle instructing a user to retrieve a device for receipt and viewing of a video or interactive file).

Again, the delivery or usability of information can be delayed until a time that is appropriate to view and comprehend the information. For example, a roadside diagnostic would be reasonable to present when a vehicle was in park. If the diagnostic related to some critical information that meant the vehicle should not be driven further (e.g., a flat tire), an in-vehicle or on-device alert of limited scope could be presented, and then more information could be presented/delivered to explain the problem when a user had pulled the vehicle over to the side of the road or parked in a lot.

Figure 5:
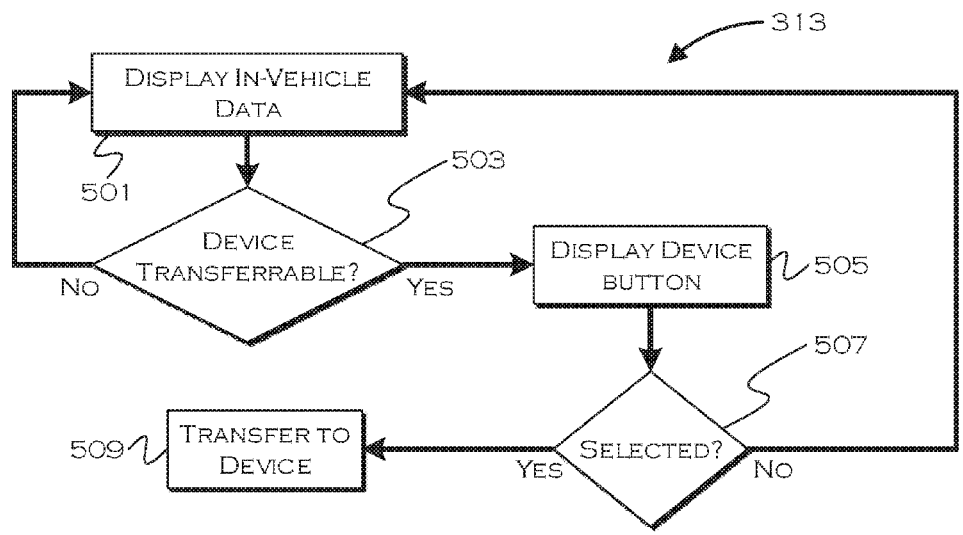
FIG. 5 shows an illustrative information transfer process.

FIG. 5 shows an illustrative information transfer process. In this illustrative example, the process receives some amount of information that is retrievable on a vehicle output 501. In this example, the information may represent some useful subset or all of the useful information. But, the user may want the information sent to a device, such as if a vehicle malfunction is detected and a vehicle display shows a replacement part, the user may want the replacement part information transferred to a mobile device the user can bring into a part store.

If the information is conveyable to a device 503, the process may present an in-vehicle option to transfer the information to a designated device 505. If the information is not transferable, the process may simply present the information in a vehicle.

If a user selects the transfer input 507, the process may locally transfer the information to a device 509, or may instruct a remote server to send the information to a pre-designated device. This allows a user to make information displayed in the vehicle into portable information, even if the vehicle output is adequate for outputting the information.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive sensor data from a vehicle sensor;
determine an existence of a condition for which information display has been designated;
determine a non-vehicular device predesignated for receipt and display of the information, responsive to a determination that a vehicle output is inadequate to output the information; and responsive to the condition determination, transfer the information to the device.

2. The system of claim 1, wherein the processor is a vehicle processor and the information is transferred to the device via Wi-Fi.

3. The system of claim 1, wherein the processor is a vehicle processor and the information is transferred to the device via BLUETOOTH.

4. The system of claim 1, wherein the processor is a server processor remote from the vehicle, and the information is transferred to the device via the Internet.

5. The system of claim 1, wherein the processor is a server processor remote from the vehicle, and the information is transferred to the device via a cellular connection.

6. The system of claim 1, wherein the processor is a server processor remote from a vehicle that includes the sensor, and the information is transferred to the device by transferring the information to the vehicle with instructions to locally transfer the information directly to the device from the vehicle.

7. A computer implemented method comprising:

responsive to a determination that information for display exists, relating to a vehicle-related condition determined from vehicle sensor data, determining a capability of a vehicle to convey the information; and responsive to a determination that the vehicle is incapable of conveying the additional information, instructing delivery of the information to a predesignated user device.

8. The method of claim 7, wherein the predesignated user device is a mobile device.

9. The method of claim 7, wherein the predesignated user device is a personal computer.

10. The method of claim 7, wherein the instructing delivery of the additional information further comprises instructing a remote server to deliver the information.

11. The method of claim 7, wherein the additional information includes information for addressing a vehicle-related problem.

12. The method of claim 7, wherein determining the capability of the vehicle to convey the additional information includes determining whether or not the vehicle includes display capability.

13. The method of claim 7, further comprising:

determining whether a user preference for conveyance of additional information corresponds to the predesignated device; and responsive to a determination that the user preference corresponds to the predesignated device, instructing delivery of the additional information to the predesignated user device, even if the vehicle is determined to be capable of conveying the additional information.

14. A system comprising:

a processor configured to:

examine vehicle sensor data to detect a vehicle condition;

determine that information display of information relating to the vehicle condition is appropriate based on predefined criteria, associated with the vehicle condition, for displaying the information;

determine a format associated with the information, including delivery capability needed to convey the information; and determine whether the information should be sent to a vehicle, a predesignated information output device, or both.

15. The system of claim 14, wherein the delivery capability includes a designation for video delivery capability.

16. The system of claim 14, wherein the delivery capability includes a designation that interactive delivery capability is required.

17. The system of claim 14, wherein the delivery capability includes a designation that text display capability is required.

18. The system of claim 14, wherein the delivery capability includes a designation that audio output capability is required.

19. The system of claim 14, wherein the processor is further configured to:

deliver audio to the vehicle instructing user reference to the predesignated output device responsive to a determination that the information should be sent to the predesignated output device.

* * * * *